United States Patent [19]
Herbstritt

[11] Patent Number: 5,611,177
[45] Date of Patent: Mar. 18, 1997

[54] PORTABLE TOWER WITH TOWER MEMBER POSITION DETECTION SYSTEM

[75] Inventor: Dale R. Herbstritt, Clemmons, N.C.

[73] Assignee: Ingersoll-Rand Company, Woodcliff Lake, N.J.

[21] Appl. No.: 529,701

[22] Filed: Sep. 18, 1995

[51] Int. Cl.⁶ .................................................. E04H 12/34
[52] U.S. Cl. ........................... 52/111; 212/293; 200/47
[58] Field of Search .......................... 52/111; 212/280, 212/293; 200/47, 61.41, 61.42; 335/205

[56] References Cited

U.S. PATENT DOCUMENTS

| | | | |
|---|---|---|---|
| 3,817,007 | 6/1974 | Hall | 52/115 |
| 4,057,942 | 11/1977 | Kranefeld et al. | 52/115 |
| 4,118,907 | 10/1978 | Small et al. | 52/118 X |
| 4,156,331 | 5/1979 | Lester et al. | 52/115 |
| 4,699,281 | 10/1987 | Kishi | 52/118 X |
| 5,249,643 | 10/1993 | Backer | 52/118 X |
| 5,412,361 | 5/1995 | Combest et al. | 335/205 |
| 5,416,456 | 5/1995 | Light | 335/205 |

Primary Examiner—Carl D. Friedman
Assistant Examiner—Beth A. Aubrey
Attorney, Agent, or Firm—Michael M. Gnibus

[57] ABSTRACT

In one aspect of the present invention, this is accomplished by providing a tower that includes a fixed member; at least one movable tower member, the at least one movable tower member is movable relative to the fixed member. The tower also includes a drive for moving the at least one movable tower member when power is supplied to the drive; and a tower position detection system comprising: a switch mounted on the fixed member and electrically connected to the drive, and an actuator member mounted in a predetermined position along the length of one of the at least one movable tower members so that when the one of the at least one movable tower members is in a predetermined location relative to the fixed member, the actuator is located proximate the switch to open the switch and terminate the supply of power to the drive.

20 Claims, 7 Drawing Sheets

PORTABLE TOWER WITH TOWER MEMBER POSITION DETECTION SYSTEM

FIELD OF THE INVENTION

The invention generally relates to a tower having at least one movable tower member, and more particularly to an improved tower where movement of the at least one tower member is limited by a tower member position detection system which includes a switch that automatically shuts off the power supply to a winch, or other means for moving the at least one movable tower member, when the at least one tower member is in a desired position and an actuator is proximate the switch.

Towers are often used to support lights, machinery or the like and are frequently fixed to portable vehicles so that the tower can be transported to a construction site or other location where use of the tower is required.

A conventional tower is shown schematically in FIG. 1 and is indicated generally at 10. The conventional tower 10 includes tower members 12 and 14. Tower member 14 is movable in a telescoping manner, relative to the tower member 12. The tower is extended and retracted by a drive system 16 which includes a winch motor 18 which may be powered manually, hydraulically, pneumatically or electrically. The winch motor is used in combination with one or more cables and pulleys, which are generally indicated in FIG. 1 at 19 and 21 respectively.

Along with winch 18, the conventional drive system 16 also includes manually operated toggle switch 20 which turns on and shuts off the motor 18, relay 22 which is electrically connected to the switch and the motor 18, and a circuit protection device 24 which may be a fuse, circuit breaker or the like.

In operation, a tower operator extends and retracts the tower by moving the toggle switch 20 between a first position for raising the tower and a second position for lowering the tower.

Referring again to FIG. 1, tower 10 is extended by moving toggle switch 20 to the first position causing power to be supplied to relay 22 and winch motor 18. The toggle switch is held in the first position by the tower operator. The powered winch increases the tension in cable 19 and in this way, extends the tower. Power is supplied to the winch motor until the tower is fully extended. When the tower is fully extended, power to the winch is interrupted either when the operator releases the toggle switch 20 or when protective device 24 is tripped. If power is supplied to the motor for a measurable length of time after the tower has been fully extended, the protective device 24 will interrupt the supply of power to the motor.

Maximum winch stall forces are imparted on the cables and other components of the tower 10 when the tower is fully extended and the power supply to the winch is not shut off. Such stall forces may be as high as 3300 lbs when the tower is fully extended. Over time, stall forces imparted repetitively on the tower cables can produce cable failure which could damage the tower. Additionally, the one or more pulleys 21, tower members 12 and 14 and other tower components must be able to sustain repeated stall forces which occur over the useful life of the tower.

Stall forces are also imparted on the cable and tower components when the tower is moved from an essentially horizontal "not in use" position to an essentially vertical "in use" position, which is shown generally in FIG. 1. A drive system like system 16, pivots the tower members 12 and 14 from the horizontal position to the vertical position. If the tower members are in the essentially vertical position and the operator does not shut off power to the winch, stall forces will be imparted on the tower cables and tower components.

In an attempt to prevent stall forces which occur during tower extension, an end-of-travel indicator, such as a stripe or other mark, has been painted or affixed to the tower member 14 near the lower tower member end. In this way, the end-of-travel indicator is only visible to the operator when the tower member 14 is fully extended. The end-of-travel indicator provides a visual indication to the tower operator when the tower is fully extended. One problem associated with such end-of-travel visible indicators is that tower operators may not see the indicators, either because the operator is distracted and is not looking at the tower when it becomes fully extended, or because visibility at a job site may be poor due to bright daylight or dark nighttime conditions. Another problem with the end-of-travel indicators is wear of the indicator. Since the indicators are exposed to the natural elements such as sun, rain and the like, after continual use, the indicators can peel or wear off the tower member.

In another attempt to limit the duration of stall forces when the tower members are moved, load-sensitive shut-off devices have been included in conventional towers. Such a load-sensitive devices shut off the power supply to the drive motor or winch when loads are sensed above a predetermined threshold load. The loads are typically due to resistance to movement of the tower members. Such devices are susceptible to "nuisance shutdown" where the device shuts off the motor in response to normal load fluctuations that occur during operation, caused by normal component wear and/or rusting. Such protective devices are not only susceptible to nuisance shut downs but are also quite expensive.

It would be beneficial to incorporate features into conventional towers, which would interrupt power to a winch motor or other drive means when the tower members are in a desired position and in this way eliminate the occurrence and effects of stall forces on the cables and other tower components.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a tower that includes a fixed member; at least one movable tower member, the at least one movable tower member is movable relative to the fixed member. The tower also includes a drive for moving the at least one movable tower member when power is supplied to the drive; and a tower position detection system comprising: a switch mounted on the fixed member and electrically connected to the drive, and an actuator member mounted in a predetermined position along the length of one of the at least one movable tower member so that when the one of the at least one movable tower members is in a predetermined location relative to the fixed member, the actuator is located proximate the switch to open the switch and terminate the supply of power to the drive.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENT

Figure 1:
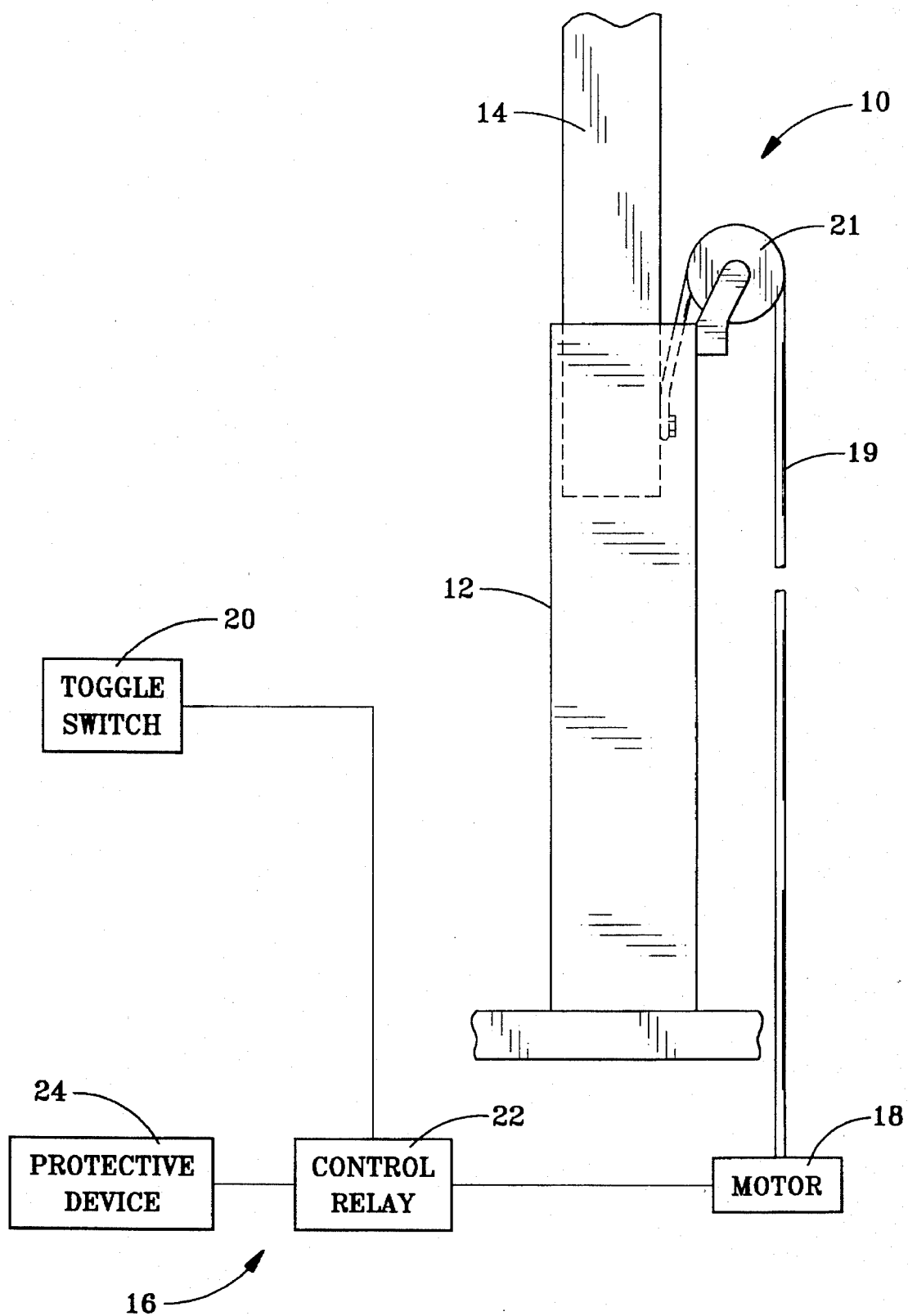
FIG. 1 is a schematic diagram of a conventional tower and tower drive system.
Figure 2:
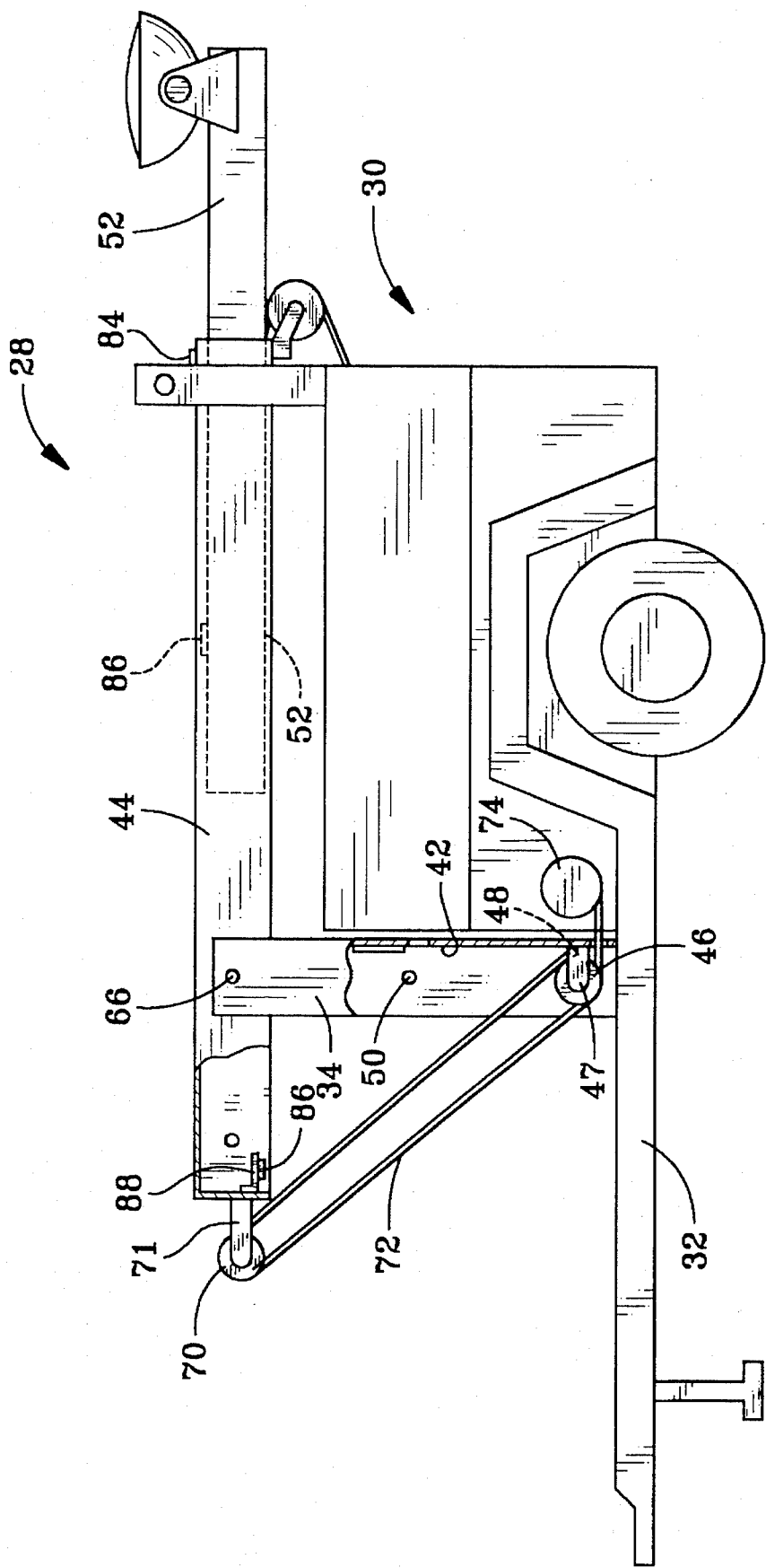
FIG. 2 is a side elevational view of a portable vehicle with a tower that includes the tower member position detection system of the present invention, where the tower is retracted and is in an essentially horizontal position.

Referring now to the drawings, wherein similar reference characters designate corresponding parts throughout the several views, FIG. 2 shows a portable tower 28 that is supported and transported by vehicle 30 which includes frame 32. A generator (not shown) is contained in vehicle 30 to supply power to the lights or tools that are supported by the tower 28.

Figure 4:
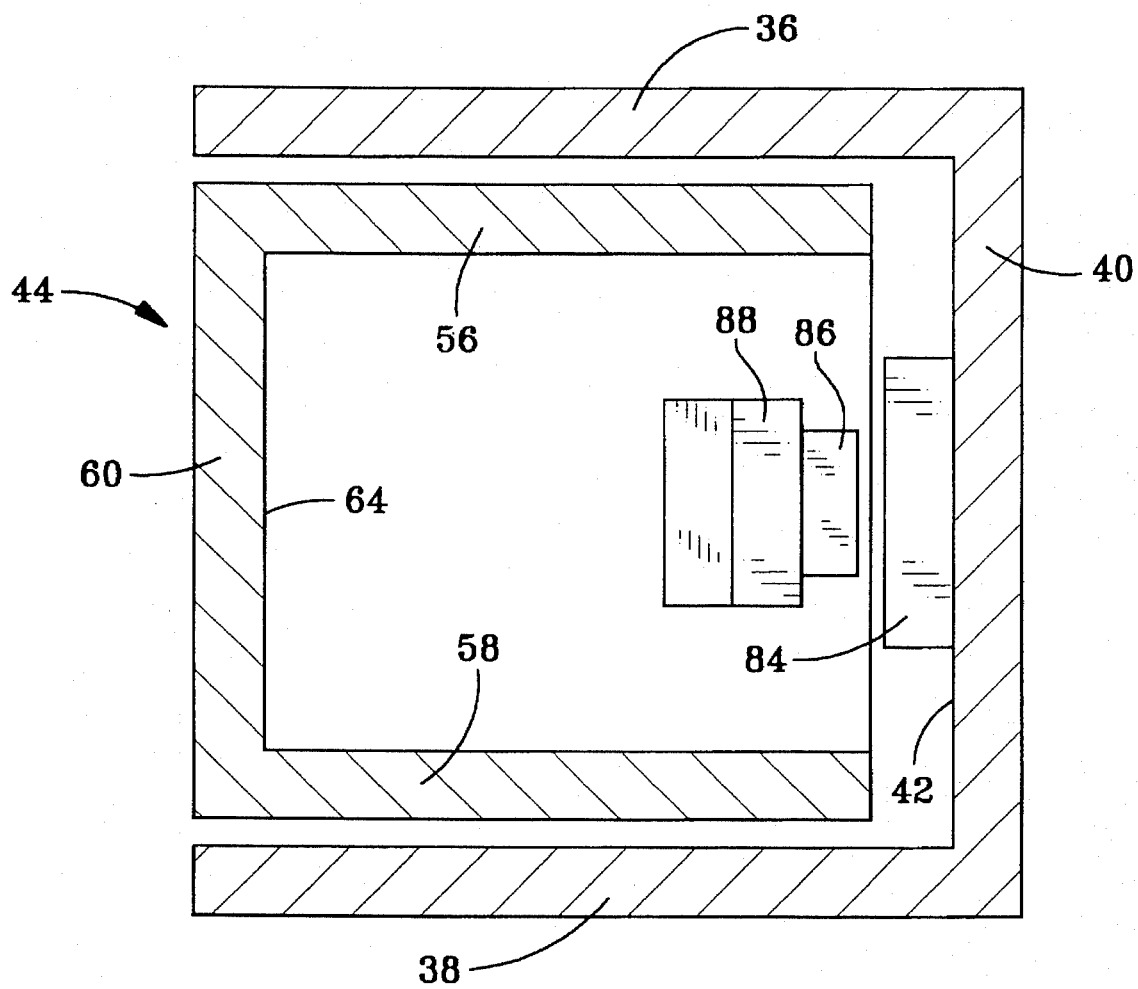
FIG. 4 is a sectional view taken along line 4—4 of FIG. 3B.

An elongate support member 34 is fixed at one end to the frame 32 and is oriented vertically relative to the frame. The end of the support member is fixed to the frame in any conventional manner including a weld or any known conventional fasteners such as bolts or the like. As shown in FIG. 4, the support member has a U-shaped cross section and includes a pair of parallel longitudinal sides 36 and 38, and wall 40 that joins the two sides. The wall and sides define channel 42 which is adapted to receive a portion of the length of tower member 44.

A conventional pulley member 46 is located in channel 42 at the fixed end of support member 34. Pulley member 46 is rotatable about a shaft (not shown) having shaft ends that are supported for rotation by the a conventional U-shaped bracket 47 which is fixed to the wall 40 by conventional fasteners that are well known in the art. A laterally extending rod 48 is supported at the rod ends in a conventional manner by the bracket 47. Openings 50 extend through the sidewalls 36 and 38 of the support member and are aligned laterally. The openings are located above the bracket 47 a distance from the support member fixed end. The orientation and relative locations of the openings, pulley and bracket are shown in FIG. 2.

Tower member 44 has a U-shaped cross section as shown in FIG. 4 and includes sidewalls, 56 and 58 which are joined by wall 60. Tower member 44 is adapted to pivot about an axis defined by coupling member 66, relative to the support member 34 and frame 32. The coupling member 66 which may be a shaft, bolt or the like, extends through openings (not shown) formed in the sidewalls of the tower member 44 and support member 34 and pivotally couples the tower member to support member 34.

Base 62 is located at one end of tower member 44 as shown in FIG. 2. The base, sidewalls 56 and 58, and wall 60 define a tower member channel 64 similar to channel 42 of support member 34. As shown in FIG. 4, the lateral dimension of channel 42 is greater than the overall lateral dimension of the tower member 44 so that a portion of the tower member can be located in channel 42. The tower member 44 is located between sidewalls 36 and 38 and pivots therebetween about the coupling member 66. The tower member 44 pivots about the coupling member between an essentially horizontal, retracted position shown in FIG. 2 and an essentially vertical extended position shown in FIG. 3B.

Openings 68 extend through sidewalls 56 and 58, are located in predetermined positions along the longitudinal lengths of the sidewalls, and are in alignment. When the tower member is in the essentially vertical position as shown in FIG. 3B, openings 68 and 50 are in alignment so that an anchor member (not shown) may be easily inserted through the aligned openings, thereby coupling tower member 44 to the support member 34.

A conventional pulley 70 is mounted for use on the base 62 by bracket 71, like bracket 47, as shown in FIG. 2. The bracket 71 is fixed to the base by conventional fasteners or a weld connection.

Cable 72 is connected to rod 48 at one cable end, extends around pulley 70 and pulley 46, passes through an opening 73 in wall 40 and is connected at a second cable end to winch 74. The cable 72, pulleys 70 and 46 and winch 74 comprise a first drive system.

Tower member 52 is adapted to move in a telescoping manner relative to tower member 44. The tower member is also movable relative to frame 32. The tower member 52 is moved in a telescoping manner by a conventional pulley and cable system using pulley 79 mounted to the upper end of tower member 44, and cable 78. Such pulley and cable systems are well known in the art and any suitable cable pulley system could be used to move the tower member 52.

Figure 5:
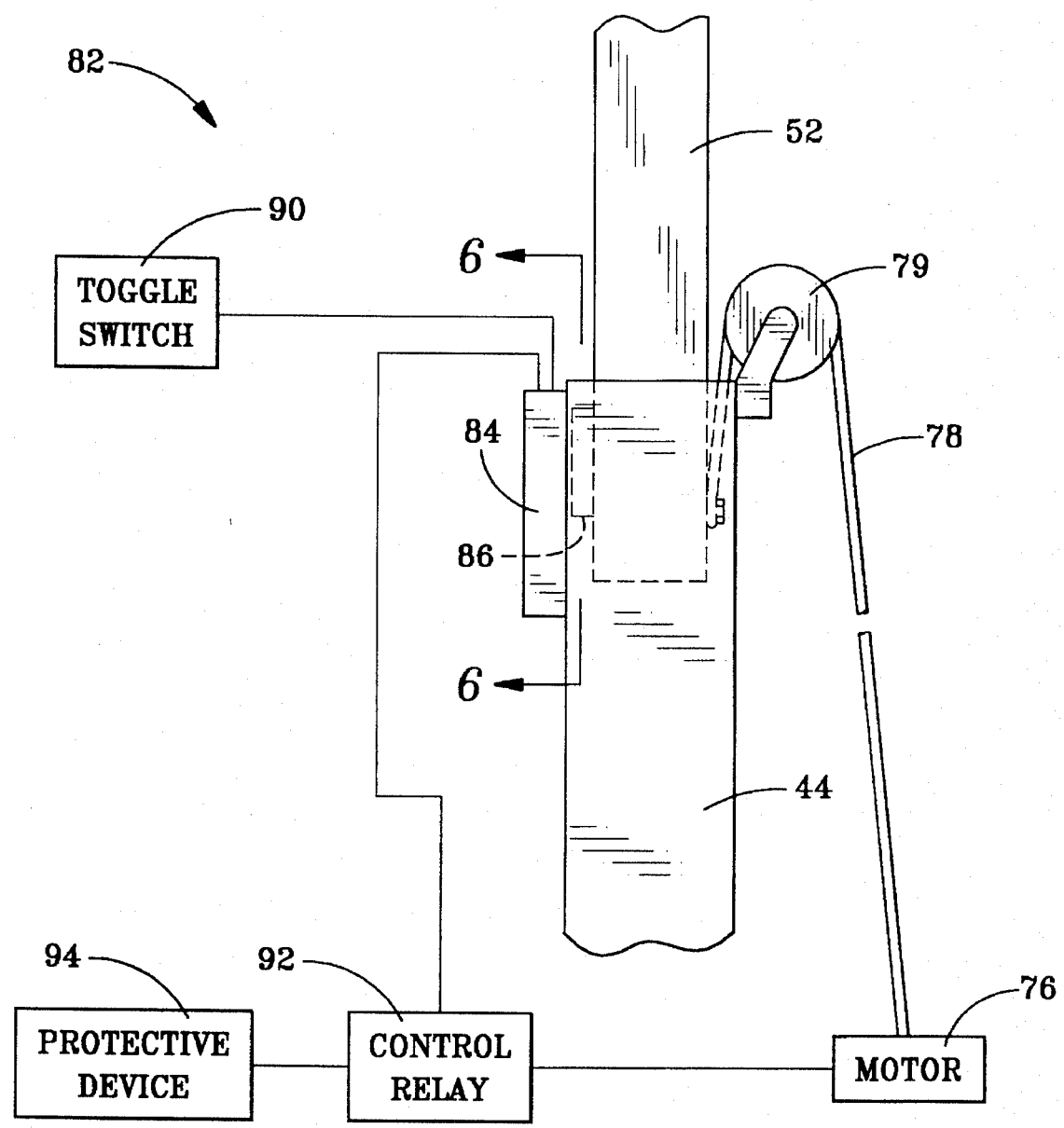
FIG. 5 is a schematic diagram of the tower member position detection system used to detect when the at least one tower member is in a desired extended position.

A winch 76, like winch 74 serves to extend and retract telescoping tower member 52. One end of cable 78 is connected to winch 76. The cable passes around pulley 79 as shown in FIG. 5, and the second cable end is connected to tower member 52 near the lower end of the tower member. The winch 76, cable 78 and pulley 79 comprise a second drive system.

The support member 34 and tower member 44 may each be referred to as a fixed member since the support member is fixed at one end to the frame and the tower member is coupled to the support member after the tower member has been moved to a desired essentially vertical position.

Tower member position detection systems 80 and 82 detect positions of the tower members when the tower members are moved. Additionally, the systems 80 and 82 shut off power to the respective drive system winch motor when the respective detection system detects that the tower members are in a predetermined, desired position. Both detection systems include at least one switch 87 that is opened by an actuator 86. In the preferred embodiment, the switch is a magnetic reed switch and the actuator is a magnet.

Figure 6:
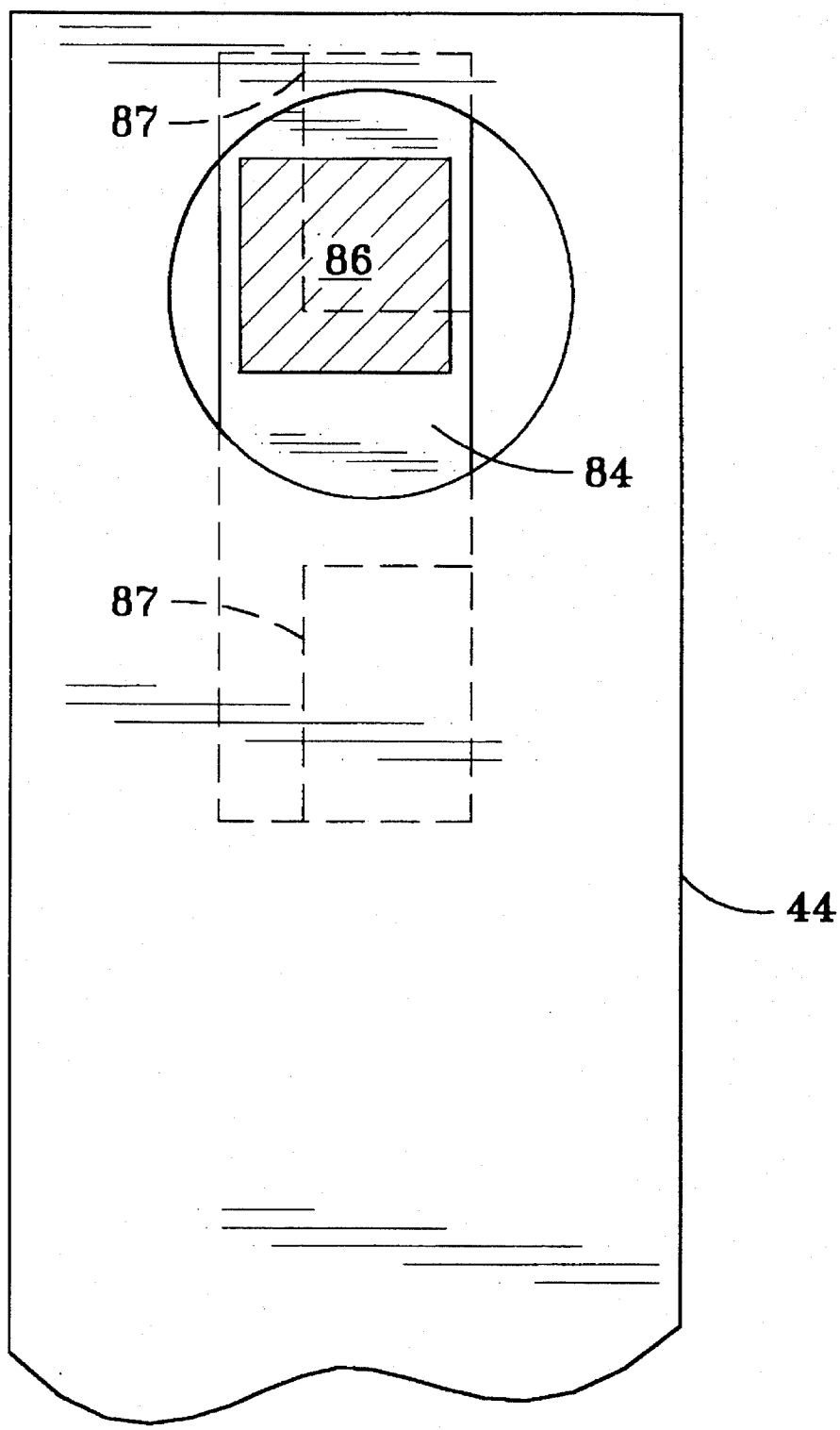
FIG. 6 is a sectional view taken along line 6—6 of FIG. 5.

The at least one switch 87 is located in a housing 84. A single switch 87 or a number of discrete switches may be positioned in the housing. As shown in FIG. 6, in the preferred embodiment, two switches are located in the housing. Each switch 87 defines a respective sensitive area along the housing. When the actuator is proximate a switch 87 and corresponding sensitive area, the switch member reacts to the presence of the actuator magnet. In the preferred embodiment, when the actuator is proximate either switch 87, the respective switch member is opened. For purposes of clarity, hereinafter only one switch 87 will be referenced and described since the description for one switch is the same as the description for the other switch.

For purposes of disclosing the preferred embodiment of the invention, the switch is a magnetic reed switch, however, it is contemplated that the switch can be any switch that is opened when an actuator member moves to a position proximate the switch.

Figure 3A:
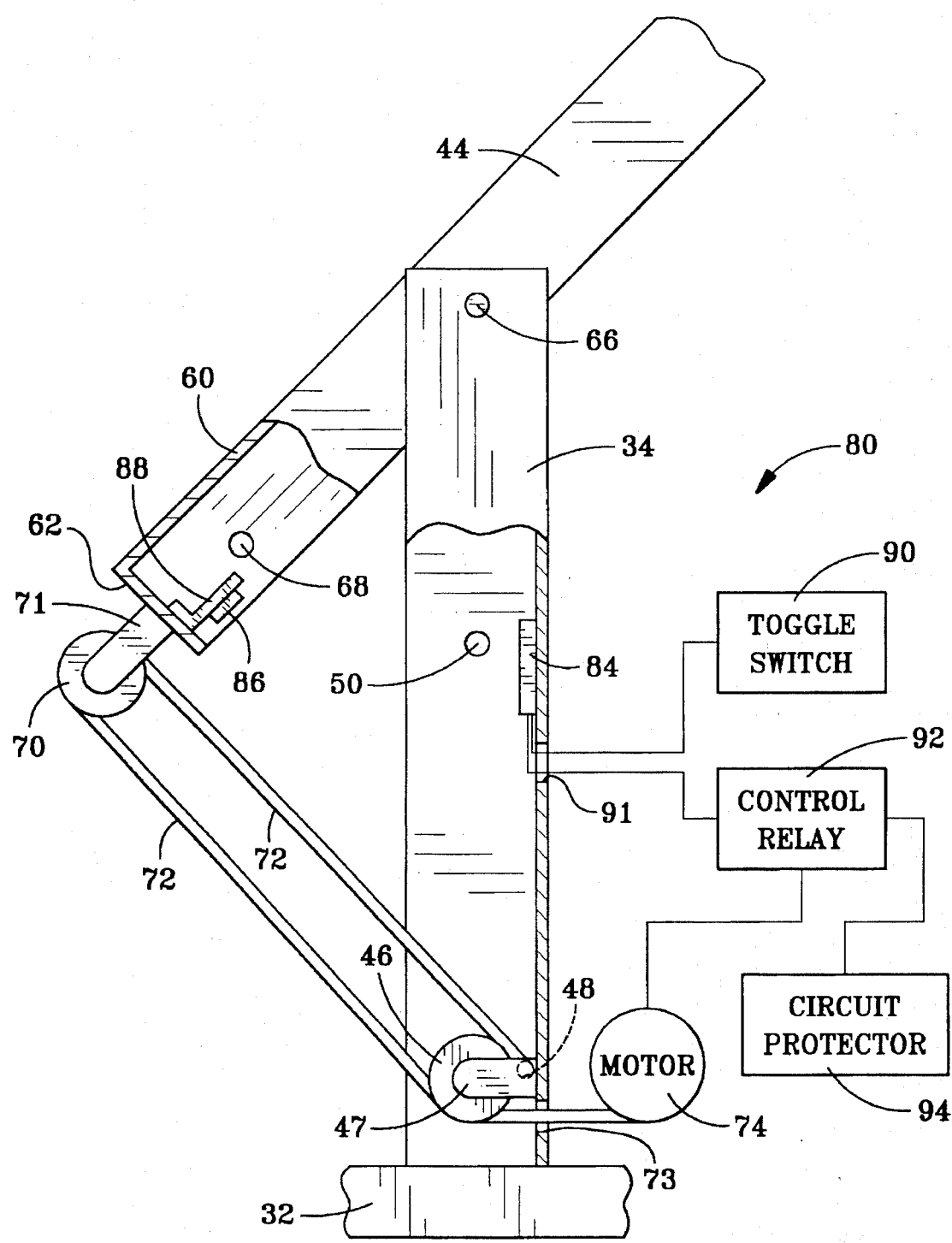
FIG. 3A is a schematic diagram of the tower member position detection system used to detect when at least one movable tower member has been moved from the position of FIG. 2 to a desired, essentially vertical position.
Figure 3B:
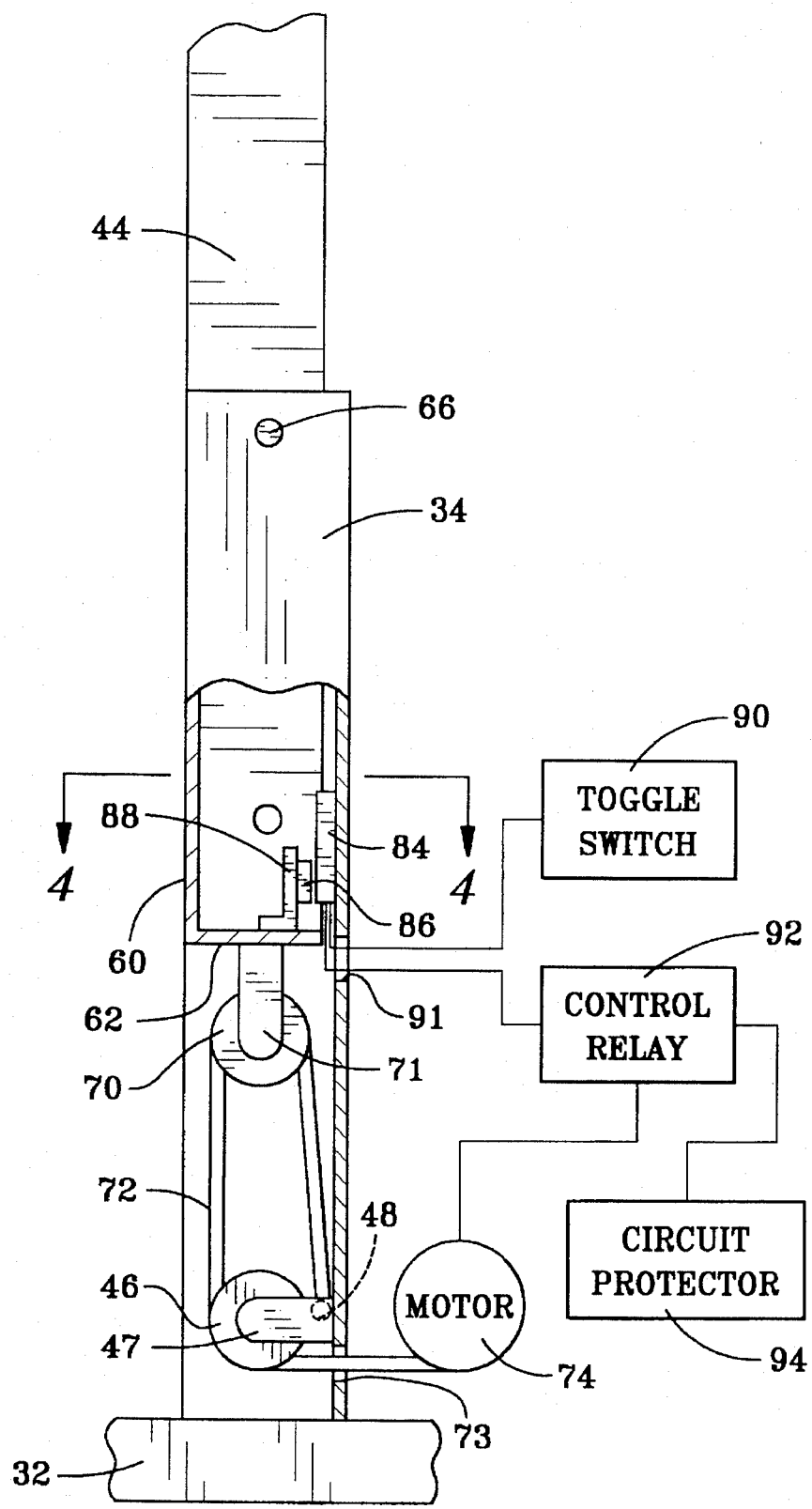
FIG. 3B is the schematic diagram of FIG. 3A with the tower in the essentially vertical position.

System 80, shown in FIGS. 3A and 3B, is used to detect when the tower members have been moved to the essentially vertical position. In the system 80, actuator 86 is mounted on the upright portion of an L-shaped bracket 88 which is located in channel 64 and is mounted on base 62, of U-shaped tower member 44. As shown in FIG. 4, the bracket is mounted on the base near the open side of channel 42 so that the actuator faces the open side of the channel. Switch 87 is mounted along wall 40 and in channel 42 of the support member 34. The switch housing 84 may be fixed to the wall 40 by conventional fasteners such as pop-rivets or screws for example. The switch is located in a predetermined position along wall 40 so that when the tower is moved to the essentially vertical position, actuator 86 is located proximate the switch as shown in FIG. 3B, thereby causing the switch to open.

System 82 is used to detect when the tower is fully extended. In system 82, switch 87 is mounted at the end of tower member 44 on outside channel 64, and in front of aperture 89 which extends through wall 60. See FIGS. 5 and 6. The actuator 86 is mounted along the outside of tower member 52 along the portion of the tower member facing switch 87 so that as the tower is extended, the actuator moves to a position proximate the switch 87 mounted on tower member 44. Like switch housing 84 of system 80 the switch housing of system 82 may be mounted on the wall 60 by conventional fasteners such as pop rivets.

In each system, a manually actuated toggle switch 90 is electrically connected to the switch 87 and a relay 92 is inserted between the switch and a winch motor. Each relay is electrically connected to the respective switch and winch. The wires or cables which form the electrical connections between the toggle switch, relay and switch in system 80, pass through an opening 91 that extends through wall 40, and shown in FIG. 3A. A circuit protector 94, such as a fuse or circuit breaker is electrically connected to each system relay 92. The toggle switch, control relay and circuit protector are all well known in the art.

In operation, portable tower 30 is transported to a site where use of the lights or tools mounted on the tower is required. During transportation, the tower is in the horizontal, retracted position shown in FIG. 2. When it becomes necessary to use the lights or tools, the tower is moved to the essentially vertical position. A tower operator turns on winch 74 by moving the toggle switch 90 of system 80 to a first position and holding the toggle switch in the first position. As cable 72 is drawn around the winch, the tower member 44 is pivoted counterclockwise relative to fixed support member 34, about coupling member 66. As the tower member moves, tower member 52 also moves with the tower member 44. The tower is pivoted until actuator 86 of system 80 is moved into channel 42, to a position proximate system switch 87 as shown in FIG. 3B. When the actuator is located proximate the switch, the switch is opened and power to the winch motor is stopped automatically. It is not necessary for the operator to release the toggle switch, since the switch 87 opens automatically by the actuator. The actuator member 86 does not need to be completely in front of the switch in order to open the switch. Movement of any portion of the actuator to a position proximate the switch will open the switch.

When winch 74 is stopped openings 50 and 68 are aligned an anchor member (not shown) is inserted through the openings. Since the openings are aligned, the anchor member can be inserted through the openings relatively easily, and the operator does not have to struggle to force the anchor through the openings. By the anchor member, the tower member 44 is coupled to support member 34 therefore tower member 44 is fixed when tower member 52 is moved in a telescoping manner relative to tower member 44.

To extend member 52, toggle switch 90 of system 82 is moved to a first position and held in the position by the operator. Power is supplied to the winch 76 and tower member 52 is moved relative to the frame 32 and tower member. The winch continues to raise the tower member 52 until actuator 86 is moved to a position proximate switch 87 mounted on the end of tower member 44. When all or a portion of the actuator is located proximate aperture 89, in the position shown generally in FIGS. 5 and 6, the tower is in the desired essentially vertical, extended position, the switch 87 is opened and the winch 76 is automatically stopped. No action is required by the tower operator.

When use of the extended tower is no longer required, the tower is retracted and pivoted to the horizontal position of FIG. 2 by a separate circuit which is not shown or described in detail and is not a part of the present invention.

If it is necessary, to less than fully extend the tower, the location of actuator 86 along the length of tower member 52 can be changed so that the switch is opened when the tower is extended to the required height.

The tower operator does not need to be concerned about releasing the toggle switch and stopping the drive motor when the tower is in a desired position since the position detection systems automatically stop the drive when the tower is in the desired position. By using tower member detection systems 80 and 82, stall forces are eliminated. Ice, snow and other airborne contaminants which may completely or partially cover the actuator and switch do not adversely affect the operation of the actuator and switch. A clear line of sight between the switch and actuator is not required. The actuator and switch combination is a low cost, effective means to automatically shut off the drive motor precisely when the tower members are in a desired position.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A tower comprising:

a) a fixed tower member, fixed to a tower frame;

b) at least one movable tower member, movable relative to said fixed tower member;

c) movable tower member drive means for moving said at least one movable tower member when power is supplied to said drive means; and d) a movable tower member position detection system for detecting when the tower is in a predetermined required position, said detection system comprising:

1) a position detection switch mounted on said fixed tower member and electrically connected to said movable tower member drive means; and 2) an actuator mounted along the length of one of the at least one movable tower members so that when the one of the at least one movable tower members is moved by the drive means to the predetermined required position relative to said fixed tower member, the actuator is located proximate the position detection switch and thereby causes the switch to open terminating the supply of power to the movable tower member drive means and as a result, movement of each of the at least one movable tower members is terminated so that each of the at least one movable tower members is located in the predetermined required position relative to the fixed tower member.

2. A tower as claimed in claim 1, wherein the position detection switch is a magnetic reed switch.

3. A tower as claimed in claim 1, wherein the actuator is a magnet.

4. A tower as claimed in claim 1 wherein the tower position detection system further comprises a manually actuated switch and a relay, said manually actuated switch is electrically connected to said position detection switch and said relay is electrically connected to said movable tower member drive means and said position detection switch.

5. A tower as claimed in claim 1, wherein the fixed tower member has a first end fixed to said frame and a first wall, and wherein said position detection switch is mounted along said first wall way from said first end.

6. A tower as claimed in claim 5, wherein said actuator is mounted on a bracket which is mounted on said at least one movable tower member.

7. A tower member as claimed in claim 6, wherein said bracket is L-shaped.

8. A tower as claimed in claim 1, wherein said fixed tower member has a wall, an end, and an aperture extending through said wall, said position detection switch mounted on said wall adjacent said opening and away from said end.

9. A tower comprising:

a) a frame;

b) a support member fixed to said frame, said support member having a length;

c) a first movable tower member, movable in a first direction with respect to said support member;

d) first movable tower member drive means for moving said first movable tower member when power is supplied to said first movable tower drive means;

e) a first tower member position detection system comprising:
1) a first switch mounted on said support member and electrically connected to said first movable tower member drive means; and
2) a first actuator mounted along the length of the first movable tower member so that when the first movable tower member is in a predetermined position relative to said support member, the first actuator is proximate the first switch and thereby opens the first switch and terminates the supply of power to said first movable tower member drive means and as a result, movement of the first movable tower member is terminated and the first movable tower member is located in the predetermined position relative to the support member.

10. A tower as claimed in claim 9 further including:

f) a second movable tower member, movable in a second direction with respect to said support member;

g) second movable tower member drive means for moving said second movable tower member when power is supplied to said second movable tower drive means;

h) a second movable tower member position detection system comprising:
1) a second switch mounted on said first movable tower member and electrically connected to said second movable tower member drive means; and
2) a second actuator mounted along the length of the second movable tower member so that when the second movable tower member is in a predetermined position relative to said support member, the second actuator is proximate the second switch and thereby opens the second switch terminating the supply of power to the second drive means and as a result, movement of the second movable tower member is terminated and the second movable tower member is located in the predetermined position relative to the support member.

11. A tower as claimed in claim 9, wherein the first switch is a magnetic reed switch.

12. A tower as claimed in claim 10, wherein the second switch is a magnetic reed switch.

13. A tower as claimed in claim 9, wherein the first actuator is a magnet.

14. A tower as claimed in claim 10, wherein the second actuator is a magnet.

15. A tower as claimed in claim 9 wherein said first tower member position detection system further comprises a manually actuated switch and a relay, said manually actuated switch is electrically connected to said first switch and said relay is electrically connected to said first drive means and said first switch.

16. A tower as claimed in claim 10 wherein said second tower member position detection system further comprises a manually actuated switch and a relay, said manually actuated switch is electrically connected to said second switch and said relay is electrically connected to said second drive means and said second switch.

17. A tower as claimed in claim 9, wherein said support member has a first wall, and wherein said first switch is mounted along said first wall.

18. A tower as claimed in claim 9, wherein said first actuator is mounted on an L-shaped bracket.

19. A tower as claimed in claim 10, wherein said first movable tower member has a wall, an end, and an aperture extending through said wall, said second switch mounted on said wall adjacent said opening.

20. A method for locating at least one movable tower member in a required predetermined position wherein in addition to the at least one movable tower member the tower includes; a fixed tower member, movable tower member drive means for moving each of the at least one movable tower members relative to said fixed tower member; a switch mounted on said fixed tower member, the switch being electrically connected to the movable tower member drive means, and an actuator mounted on one of said at least one movable tower members, the method comprising the steps of:

a) supplying power to said movable tower member drive means;

b) moving said at least one movable tower member relative to said fixed tower member;

c) positioning said actuator member proximate said switch causing the switch to open and thereby terminating the supply of power to said movable tower member drive means.

* * * * *